United States Patent Office 3,270,042
Patented August 30, 1966

3,270,042
PROCESS FOR PURIFYING TETRAMETHYL LEAD
Herman E. Collier, Jr., Newark, Del., assignor to E. I. du Pont de Nemours and Company, Wilmington, Del., a corporation of Delaware
No Drawing. Filed May 28, 1963, Ser. No. 283,714
5 Claims. (Cl. 260—437)

This invention relates to the purification of tetramethyl lead and particularly to a novel and highly effective method for removing sludge-forming bismuth impurity from tetramethyl lead.

Tetramethyl lead is a highly useful antiknock compound and, like tetraethyl lead, can be manufactured by alkylation of lead alloys. One general method comprises reacting methyl chloride with sodium lead alloy in the presence of an alkylation catalyst, normally an aluminum-based catalyst, as disclosed by Jarvie, Schuler and Sterling in U.S. Patent 3,048,610 and by Cook and Sistrunk in U.S. Patent 3,049,558. Much more prone to ignite and decompose explosively under certain conditions than tetraethyl lead, tetramethyl lead requires special handling.

Those skilled in the art, however, have long been aware that tetramethyl lead can be effectively stabilized for safe handling during all phases of manufacture, recovery, storage and use, by dilution with volatile hydrocarbons, halohydrocarbons and other substances, many of which are disclosed by Calingaert in U.S. Patents 2,660,591–6. Jarvie et al. above disclose recovering tetramethyl lead from the methylation reaction mass by steam distillation in the presence of toluene which codistills with the tetramethyl lead and protects it against decomposition in the vapor phase. It is also considered advantageous to collect the steam distillate in a volatile halohydrocarbon diluent having fire retardant properties. Ethylene dichloride is particularly useful in this regard and serves a dual purpose since it also has utility as a lead scavenger in the antiknock use of the tetramethyl lead.

It is disclosed, by Peck in U.S. Patent 2,293,214 and by Downing and Linch in U.S. Patent 2,407,261, among others, that tetramethyl lead, like tetraethyl lead and other tetraalkyl leads produced in like manner, tends to undergo objectionable sludging attributable to unstable alkyl bismuth impurity arising from bismuth contaminant in the lead used for its manufacture. According to prior disclosures, such sludge in general, when in conjunction with adsorbed tetraalkyl lead, often tends to ignite on exposure to oxygen or air and thus constitutes a serious fire and explosion hazard. With tetramethyl lead, sludging is believed by some to constitute an especially hazardous situation in view of the relative ease with which such compound is ignited and decomposed. On general grounds too, formation of haze and insolubles is objectionable, for such matter tends to clog delivery lines, promote corrosion of equipment and even accelerate deterioration of the organo-lead product.

To remove sludging impurities from tetraalkyl leads, Peck (noted above) discloses treatment of the impure product with certain acidic reagents. Bertolette and Parmelee in U.S. Patent 2,400,383 effect precipitation of sludge-forming bismuth impurities from tetraethyl lead by treatment with oxygen. Parmelee, in U.S. Patents 2,410,356, 2,426,789 and 2,440,810, utilized the oxidizing action of aqueous hydrogen peroxide, dichromate, perborate or chlorite salts to precipitate bismuth sludge. It will be noted that, while Peck alleges that tetramethyl lead may also be purified by acid or metal halide treatment, Bertolette and Parmelee appear to limit their disclosures to the treatment of tetraethyl lead.

To this day, the air-blowing method of Bertolette and Parmelee is practiced in the manufacture of tetraethyl lead. However, such oxidative treatment is practically without effect when applied to tetramethyl lead. The oxidizing solutions of the later Parmelee patents are also unsatisfactory for this purpose, tending either to be impractically slow in their action or to be only partially effective.

An object of this invention is to provide a novel process for purifying tetramethyl lead which contains a soluble bismuth impurity in an amount such that it normally tends to form haze and sludge during storage. Another object is to provide such a process which converts the soluble bismuth impurity into a readily removable form and which is highly effective at ordinary atmospheric temperatures. A particular object is to provide such a process for the treatment of compositions which are concentrated solutions of tetramethyl lead in normally liquid solvents which are stabilizers for the tetramethyl lead and especially solvents which include a halohydrocarbon fire retardant material. A further object is to provide new compositions of matter and to advance the art. Still other objects will appear hereinafter.

The above and other objects of this invention may be accomplished by the process for purifying tetramethyl lead containing a soluble bismuth impurity in an amount such that it normally tends to form haze and insoluble sludge during storage, which process comprises
(A) intimately contacting said tetramethyl lead in the liquid phase
(B) at a temperature of from about 0° C. to about 80° C.,
(C) with ozone in an inert carrier gas until the soluble bismuth impurity has been decreased to the desired extent, and
(D) then separating the bismuth reaction product from the reaction mixture.

In a preferred aspect of this invention, the process is applied to a composition consisting essentially of about 95% to about 35% by weight of tetramethyl lead containing a soluble bismuth impurity in an amount such that it normally tends to form haze and insoluble sludge during storage, and about 5% to about 65% by weight of a normally liquid ozonization medium which is an inert solvent for the tetramethyl lead. By normally liquid is meant that the material exists as a liquid at atmospheric pressure and normal room temperature, i.e. about 25° C.

This invention is based on the discovery that ozone is both highly selective and effective in destroying soluble bismuth impurity in the presence of rather large proportions of tetramethyl lead. In surprising contrast, the oxidizing agents of the prior art are of little or no value in this process. Treatment of such impure tetramethyl lead compositions according to this invention results in a decrease in the soluble bismuth content accompanied by the appearance of haze and insoluble matter which are readily removable by conventional filtration and washing techniques. Thus, by this process, tetramethyl lead can be obtained clear and substantially free of solids-forming bismuth impurity. The process is easy to operate and the quantities of materials, temperatures, times and intimacy of contact of the reactants are easily coordinated to reduce the bismuth content of the tetramethyl lead composition to an acceptable level, for example below 10 p.p.m. or to substantially nil if desired. Tetramethyl lead losses are normally low, less than 0.5%.

Ordinarily, the impure tetramethyl lead composition, to be treated according to this invention, will contain from about 20 to about 2000 p.p.m. (parts per million) of bismuth, more usually about 100 to about 200 p.p.m., depending on the level of Bi impurity in the lead used in its manufacture. Virgin lead normally contains about 0.02% wt. Bi (200 p.p.m.). However, the Bi content may vary considerably upwards or downwards depending on the prior processing history of the starting lead. Also, tetramethyl lead compositions, containing less than 20 p.p.m. Bi, can be treated and converted to a substantially nil Bi product, if desired. It is believed that higher levels of Bi impurity than 2000 p.p.m., if ever encountered, can also be successfully decreased in accordance with the objects and methods of this invention.

Mainly for reasons of safety, the tetramethyl lead is preferably employed in this process as a solution in a normally liquid inert solvent which is both an ozonization medium (i.e. substantially inert to ozone under the conditions of treatment) and an inert solvent for tetramethyl lead. Practically, the solvent usually will boil within the range of about 70° C. to about 250° C. (at atmospheric pressure), preferably in the range of about 80° C. to about 150° C. Also preferably, the solvent will be a stabilizer for the tetramethyl lead or will contain a stabilizing quantity of such a stabilizer which is also suitable for use as an ozonization medium. A wide variety of normally liquid ozonization media are known, as more particularly disclosed by Bailey, Chemical Reviews 58, 925–1010 (1958), which are also solvents for and suitably inert towards tetramethyl lead, and which may be used in this process. Obviously, it will be preferred to use those substances and mixtures thereof which not only can stabilize tetramethyl lead against various modes of decomposition but which have utility also in other areas such as in the formulation of antiknock blends.

Suitable ozonization solvents include the normally liquid alkanes, haloalkanes, nitroalkanes, aromatic hydrocarbons, haloaromatic hydrocarbons, and saturated aliphatic carboxylic esters, ketones, carboxamides and ethers. It will be recognized that many of these classes of compounds also have utility as stabilizers for tetraalkyl lead compounds, as disclosed by Calingaert in U.S. Patents 2,660,591–6 and by Cook et al. in U.S. Patent 3,049,558, particularly the saturated aliphatic hydrocarbons and the aromatic hydrocarbons, such as gasoline hydrocarbons of the alkylate and aromatic type, including refinery fractions and individual components thereof, exemplified by hexane, heptane, isooctane, benzene, toluene, ethylbenzene, the xylenes, and mixtures thereof. When mixtures are used, a major proportion should preferably boil between 90° C. and 150° C. In other words, for maximum effectiveness, the stabilizer should boil close to and preferably bracket the boiling point of tetramethyl lead.

It will also be recognized that many of the haloalkanes and haloaromatic hydrocarbons, which are suitable as ozonization solvents, also have fire-retardant properties and hence are desirable solvent components. Preferred are those having utility as scavengers for lead in the operation of spark ignition internal combustion engines, broadly those containing 2–3 halogen atoms of atomic numbers 17 to 35, 2 to 8 carbons, and normally boiling below 250° C., particularly the ethylene dihalides, ethylene dichloride and ethylene dibromide. Other halohydrocarbons that may be used are the corresponding propylene dihalides, chlorobenzene, dichlorobenzene, bromobenzene, dibromotoluene, and the like.

Still other ozonization solvents are the normally liquid carboxylic esters, ketones, amides, ethers and nitro compounds, exemplified by ethyl acetate, acetone, formamide, tetrahydrofuran and nitromethane. It should be noted that, while some of the solvents are themselves attackable by ozone under certain conditions, the aromatic hydrocarbons for example, such materials are still useful in ozonizations of more easily ozonized substances. Such is the present case, organo bismuth being preferentially attacked by ozone.

Usually, the solvent will be a mixture of one or more hydrocarbons which are stabilizers for the tetramethyl lead and one or more alkylene dihalides in which the halogen atoms are of atomic numbers 17 to 35. In such solvent mixtures, the hydrocarbon preferably will be toluene, a gasoline fraction substantially free of olefins, or isooctane, and the alkylene dihalide preferably will be an ethylene dihalide. The most preferred solvent mixtures are those consisting essentially of toluene and either one or both of ethylene dichloride and ethylene dibromide.

The quantity of solvent material may vary widely, but, considering that tetramethyl lead is normally sold as a concentrate, undue dilution should be avoided. For example, the solvent matter may account for about 5% to about 65% by weight of the composition, the rest being tetramethyl lead, i.e. about 95% to about 35% by weight of the composition. Preferably, the composition will consist essentially of about 70% to about 35% by weight of tetramethyl lead and about 30% to about 65% by weight of solvent. When, in the preferred embodiments of this invention, a hydrocarbon, such as toluene, is employed in combination with a halohydrocarbon such as ethylene dichloride as a solvent mixture, the hydrocarbon will ordinarily comprise about 20% to about 67% by weight of such solvent mixture, the rest being halohydrocarbon, i.e., about 80% to about 33% by weight of the solvent mixture. Preferably, the solvent mixture will consist essentially of about 33% to about 53% by weight of toluene and about 67% to about 47% by weight of either or both of ethylene dichloride and ethylene dibromide.

Representative preferred tetramethyl lead compositions consist essentially of from about 35 to about 70 wt. percent of tetramethyl lead, about 10 to about 45 wt. percent of toluene or other hydrocarbon stabilizer with the desired degree of volatility, and about 20 to about 40 wt. percent of ethylene dichloride or other halohydrocarbon solvent providing fire-retardant properties. Included are antiknock blend compositions such as: 57 wt. percent tetramethyl lead, 32 wt. percent ethylene dichloride and 11 wt. percent toluene; 52 wt. percent tetramethyl lead, 10 wt. percent toluene, 19 wt. percent ethylene dichloride and 19 wt. percent ethylene dibromide; 34 wt. percent tetramethyl lead, 42 wt. percent toluene and 24 wt. percent ethylene dibromide; and 34 wt. percent tetramethyl lead, 21 wt. percent isooctane, 21 wt. percent xylene and 24 wt. percent ethylene dibromide.

Ozone, its generation, and its use in chemical technology, is rather fully described in Kirk-Othmer's Encyclopedia of Chemical Technology, vol. 9, Interscience, pages 735–753; in No. 21 of the Advances in Chemistry Series, Ozone Chemistry and Technology, Am. Chem. Soc. 1959; by Smith et al. in Organic Syntheses, vol. 26, pages 63–76; and by Bailey in Chemical Reviews, 58, 925–1010 (1958).

In the process of this invention, the ozone is employed in an inert carrier gas (substantially inert to the tetramethyl lead and to the solvents). For such purposes, the ozone is conveniently and economically produced by the action of an ozonator discharge on air or oxygen, whereby it is obtained diluted with said source gas in concentrations normally ranging from about 0.1 to about 25 mg./liter of said oxygen or air, the oxygen or air being an inert carrier gas of this invention. More usual operating concentrations are in the range of about 0.5 to about 15 mg./liter. The higher concentrations are preferred, since the higher the ozone level the more rapid the rate of destruction of the Bi impurity in the tetramethyl lead composition, and since also with the lower concentrations an induction period may sometimes be encountered before substantial quantities of bismuth precipitate. Other carrier gases for ozone, which are inert at the temperatures of operation, may be used; e.g. carbon dioxide, nitrogen, helium, neon, and methane. Practically, however, the carrier gas, normally and preferably, will be air.

The quantity of ozone needed depends on the Bi content of the tetramethyl lead, the time of contact allotted, the efficiency of the gas-liquid contact and the effect desired, and usually is in the range of 1 to 25 moles per atom of Bi impurity. Preferably, there usually will be used at least about 4 and not more than about 15 moles of ozone per atom of Bi. Unduly prolonging the contact of the ozone stream with the tetramethyl lead beyond the time required to achieve the desired result is normally avoided, particularly at the higher temperatures.

The process is easy to operate. The ozone is simply brought into intimate contact with the tetramethyl lead composition to be treated, by blowing the ozone-carrier gas stream through said composition at a rate sufficient to provide good gas-liquid contact. Flow rates of the order of up to 2 liters/minute of ozone-containing gas per 100 ml. of liquid phase (tetramethyl lead composition), preferably 0.1 to 1 liter/minute, suffice, and no additional means of agitation are required.

The reaction temperatures employed usually and preferably will be of the order of ordinary atmospheric temperatures, about 20° C. to about 35° C., but may range more widely, say from 0° C. to 80° C., preferably not above about 50° C. Cooling the reaction mass does not appear necessary but may be employed. The reaction is rapid, the time required depending primarily on the bismuth content of the starting composition, the ozone concentration, the intimacy of the gas-liquid contact, and the results desired. Entrainment losses of volatile components can be minimized in the usual way through use of condensing means in the off-gas line.

As the soluble bismuth impurity is destroyed, it collects as haze and precipitate in the reaction mixture and is readily separated from the tetramethyl lead composition by filtration or by washing with water or dilute aqueous alkali, including the alkali metal hydroxides, carbonates and bicarbonates, and aqueous solutions of ammonia or of water-soluble amines. Both filtration and washing may be used, if desired.

The recovered tetramethyl lead composition is of high purity and highly resistant to sludging. It can be used directly in the formulation of antiknock blends with the usual addition agents such as either or both of ethylene dibromide and ethylene dichloride, and an identifying dye.

The following examples more clearly illustrate the invention, preferred modes of carrying it into effect, and the advantageous results to be obtained thereby.

In these examples, ozone was generated in a commercial laboratory ozonator, by passing dry air through the electric discharge of the ozonator and adjusting the air flow rate and the applied voltage to vary the ozone concentration.

The reactor consisted of a vertically disposed glass cylinder 1.5 inch internal diameter and 12 inches long, having an entrance leg for admitting gas through a fritted glass disc near its base, and being equipped at the top with a water-cooled condenser to reduce entrainment losses.

In the general operating procedure, which is merely illustrative, the reactor was charged with about 200 grams of tetramethyl lead composition and the ozone-carrier gas stream was blown up through the liquid at a rate sufficient to provide intimate mixing and result in a high degree of ozone utilization. Periodically, the tetramethyl lead phase was observed for visual changes, then filtered, and its residual soluble bismuth content determined. Tetramethyl lead losses were less than 0.5 wt. percent.

*Example 1*

187 grams of a tetramethyl lead composition, consisting essentially of 63 wt. percent tetramethyl lead, 15 wt. percent toluene and 22 wt. percent ethylene dichloride, and having a soluble bismuth content of 110 p.p.m., is blown at about 25° C. with a stream of ozonized air containing 0.51 mg. ozone/liter and flowing at a rate of 0.57 liter/minute. After 60 minutes, the residual soluble bismuth content of the treated tetramethyl lead composition is 10 p.p.m. The ozone utilized amounted to about 3.7 moles per atom of Bi originally present in the composition.

*Example 2*

In the manner described in Example 1, a crude tetramethyl lead charge (TML), weighing 203 grams and consisting of 64 wt. percent tetramethyl lead, 14 wt. percent toluene and 22 wt. percent ethylene dichloride, and containing 105 p.p.m. soluble bismuth, is blown with ozonized air containing 7.4 mg. ozone/liter, at a flow rate of 0.57 liter/minute. The results are tabulated below:

TABLE I.—REMOVAL OF Bi FROM TML BY OZONIZATION

| Elapsed Time, Minutes | Residual Bi, p.p.m. | TML Appearance |
| --- | --- | --- |
| 0 | 105 | Clear. |
| 2 | 66 | Slight haze. |
| 4 | 36 | Haze. |
| 6 | 11 | Do. |

Filtering of the product obtained by the 6 minute treatment, yields a clear product highly resistant to sludging and suitable for direct use in the formulation of antiknock blends. The ozone utilized amounted to about 5.3 moles per atom of Bi originally present.

*Example 3*

To compare the effectiveness of air and of ozone in the process of this invention, separate samples, each approximately 202 grams of a composition (TML) consisting essentially of 64 wt. percent tetramethyl lead, 14 wt. percent toluene, and 22 wt. percent ethylene dichloride and containing roughly 87 p.p.m. of sludge-forming soluble bismuth, are treated at 25° C.–27° C. and at a flow rate of 0.57 liter/minute with a stream of air containing either no ozone (i.e. taken as such) or containing 1.6 mg. ozone/liter. The results are shown in Table II.

TABLE II.—COMPARISON BETWEEN OZONE AND AIR FOR REMOVING Bi FROM TML

| Elapsed Time, Minutes | Ozone Present | Residual Bi, p.p.m. |
| --- | --- | --- |
| 0 | No | 87 |
| 30 | do | 86 |
| 45 | do | 83 |
| 25 | Yes | 25 |
| 30 | do | 3 |
| 40 | do | 1 |

The superiority of the ozone is readily apparent from the tabulated results. Further, whereas the aerated product is prone to gradually form sludge in storage, the ozonized samples, after the 30 and 40 minute treatments, remain free of such tendency indefinitely. The ozone, utilized in the 40 minute treatment, corresponded to about 8.8 moles per atom of Bi originally present in the tetramethyl lead composition.

The tetramethyl lead compositions, after treatment in the preceding Examples 1–3, showed no sludging in storage for 6–12 months. The deposited solids, obtained by the ozone treatments, contained substantially nil lead, showing that the losses of tetramethyl lead in such treatments were low.

*Example 4*

Comparative data on the effectiveness of representative oxidizing solutions of the prior art are given below.

5 to 10 parts of an oxidizing solution as identified below were added to 23 parts of crude tetramethyl lead composition consisting essentially of 64% tetramethyl lead, 14% toluene and 22% ethylene dichloride, and having a soluble bismuth content of 84 p.p.m. The mixture was vigorously agitated at 25° C. for 48 hours, and then washed with an equal volume of water. The effect of such treatment on the soluble bismuth content is tabulated below.

TABLE III.—EFFECT OF TREATMENT WITH OXIDIZING AGENTS NOT OF THIS INVENTION ON TML Bi CONTENT

| Reagent: | Residual Bi content, p.p.m. |
|---|---|
| 3% aqueous hydrogen peroxide | 76 |
| Saturated aqueous calcium peroxide | 80 |
| Saturated aqueous sodium perborate | 33 |

It will be understood that the foregoing examples are given for illustrative purposes solely and that this invention is not limited to the specific embodiments described therein. On the other hand, it will be readily apparent to those skilled in the art that, subject to the limitations set forth in the general description, many variations and modifications can be made in the materials, conditions, and procedures employed without departing from the spirit or scope of this invention.

From the foregoing description, it will be apparent that this invention provides a novel process for removing bismuth impurity from tetramethyl lead and concentrates thereof and which produces highly stable tetramethyl lead compositions. The process is highly effective, simple, economical and can be carried out with a minimum of hazard. Accordingly, it will be apparent that this invention constitutes a valuable contribution to and advance in the art.

The embodiments of the invention in which an exclusive property or privilege is claimed are defined as follows:

1. The process for purifying a composition which consists essentially of
   (I) about 95% to about 35% by weight of tetramethyl lead containing a soluble bismuth impurity in an amount such that it normally tends to form haze and insoluble sludge during storage, and
   (II) about 5% to about 65% by weight of a normally liquid ozonization medium which is an inert solvent for the tetramethyl lead and at least part of which is a stabilizing amount of a stabilizer for tetramethyl lead,
which process comprises
   (A) intimately contacting said composition in the liquid phase
   (B) at a temperature of from about 0° C. to about 80° C.
   (C) with ozone in an inert carrier gas until the soluble bismuth impurity has been decreased to the desired extent, and
   (D) then separating the bismuth reaction product from the reaction mixture.

2. The process for purifying a composition which consists essentially of
   (I) about 95% to about 35% by weight of tetramethyl lead containing a soluble bismuth impurity in an amount such that it normally tends to form haze and insoluble sludge during storage, and
   (II) about 5% to about 65% by weight of a normally liquid ozonization medium which is an inert solvent for the tetramethyl lead and which consists essentially of a mixture of
      (a) about 20% to about 67% by weight of at least one normally liquid hydrocarbon which is a stabilizer for tetramethyl lead and
      (b) about 80% to about 33% by weight of at least one normally liquid halohydrocarbon which is a scavenger for lead,
which process comprises
   (A) intimately contacting said composition in the liquid phase
   (B) at a temperature of from about 0° C. to about 80° C.
   (C) with ozone in an inert carrier gas until the soluble bismuth impurity has been decreased to the desired extent, and
   (D) then separating the bismuth reaction product from the reaction mixture.

3. The process for purifying a composition which consists essentially of
   (I) about 70% to about 35% by weight of tetramethyl lead containing a soluble bismuth impurity in an amount such that it normally tends to form haze and insoluble sludge during storage, and
   (II) about 30% to about 65% by weight of a normally liquid ozonization medium which is an inert solvent for the tetramethyl lead and which consists essentially of a mixture of
      (a) about 20% to about 67% by weight of at least one normally liquid hydrocarbon which is a stabilizer for tetramethyl lead and
      (b) about 80% to about 33% by weight of at least one normally liquid halohydrocarbon which is a scavenger for lead,
which process comprises
   (A) intimately contacting said composition in the liquid phase
   (B) at a temperature of from about 0° C. to about 80° C.
   (C) with air containing from about 0.5 to about 15 mg. of ozone per liter of air until the said composition has been contacted with from about 5 to about 15 moles of ozone per atom of bismuth in said composition, and
   (D) then separating the bismuth reaction product from the reaction mixture.

4. The process for purifying a composition which consists essentially of
   (I) about 70% to about 35% by weight of tetramethyl lead containing a soluble bismuth impurity in an amount such that it normally tends to form haze and insoluble sludge during storage, and
   (II) about 30% to about 65% by weight of a normally liquid ozonization medium which is an inert solvent for the tetramethyl lead and which consists essentially of a mixture of
      (a) about 20% to about 67% by weight of toluene and
      (b) about 80% to about 33% by weight of at least one ethylene dihalide in which the halogen atoms are of atomic numbers 17 to 35, inclusive,
which process comprises
   (A) intimately contacting said composition in the liquid phase
   (B) at a temperature of from about 0° C. to about 80° C.
   (C) with air containing from about 0.1 to about 25 mg. of ozone per liter of air until the said composition has been contacted with from about 5 to about 25 moles of ozone per atom of bismuth in said composition, and
   (D) then separating the bismuth reaction product from the reaction mixture.

5. The process for purifying a composition which consists essentially of
   (I) about 70% to about 35% by weight of tetramethyl lead containing a soluble bismuth impurity in an amount such that it normally tends to form haze and insoluble sludge during storage, and
   (II) about 30% to about 65% by weight of a normally liquid ozonization medium which is an inert solvent for the tetramethyl lead and which consists essentially of a mixture of
      (a) about 20% to about 67% by weight of toluene and
      (b) about 80% to about 33% by weight of at least one ethylene dihalide in which the halogen atoms are of atomic numbers 17 to 35, inclusive,
which process comprises (A) intimately contacting said composition in the liquid phase
(B) at a temperature of from about 20° C. to about 35° C.
(C) with air containing from about 0.5 to about 15 mg. of ozone per liter of air until the said composition has been contacted with from about 5 to about 15 moles of ozone per atom of bismuth in said composition, and
(D) then separating the bismuth reaction product from the reaction mixture.

No references cited.

TOBIAS E. LEVOW, *Primary Examiner.*

E. C. BARTLETT, H. M. S. SNEED,
*Assistant Examiners.*